Figure 1:
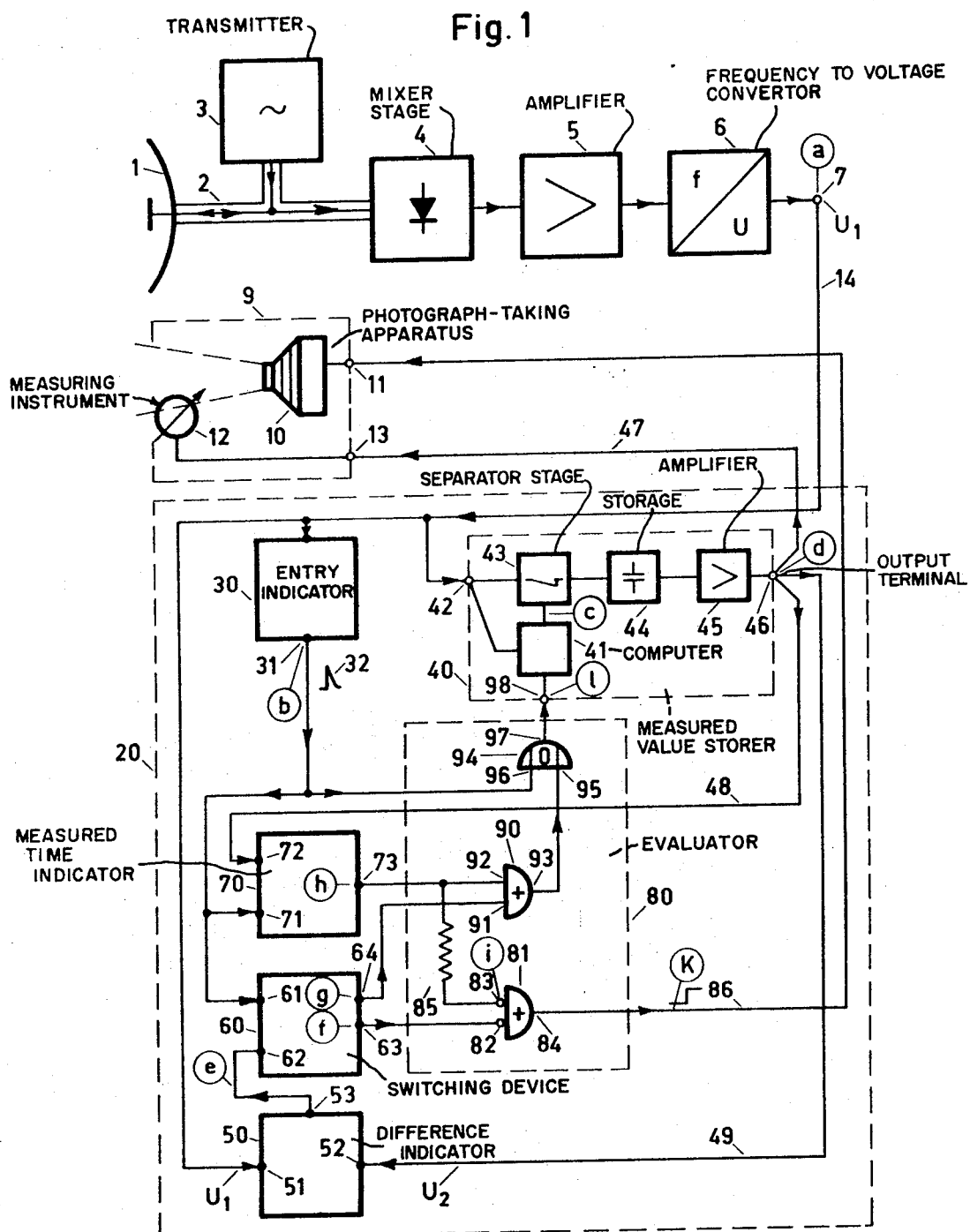

_United States Patent_ [19]

Balsiger

[11] 3,754,253
[45] Aug. 21, 1973

[54] APPARATUS AND PROCESS FOR TRIGGERING THE CAMERA OF A DOPPLER SPEED-MEASURING APPARATUS

[75] Inventor: Rudolf Balsiger, Neuenhof, Switzerland

[73] Assignee: Zellweger, Ltd., Uster, Switzerland

[22] Filed: Feb. 24, 1969

[21] Appl. No.: 801,356

[30] Foreign Application Priority Data
Feb. 15, 1968 Switzerland.......................... 2266/68

[52] U.S. Cl.................................... 343/7 ED, 343/8
[51] Int. Cl.............................................. G01s 9/44
[58] Field of Search.................... 343/6, 6 TV, 7 ED, 343/7.7, 8

[56] References Cited
UNITED STATES PATENTS
2,683,071  7/1954  Pearle........................... 343/7 ED X

| 3,122,740 | 2/1964 | Kruse et al.............. | 343/7 ED X |
| 3,137,538 | 6/1964 | Handschin............... | 343/8 X |
| 3,148,015 | 9/1964 | Weaver.................... | 343/8 X |
| 3,206,748 | 9/1965 | Miller...................... | 343/7 ED X |
| 3,243,806 | 3/1966 | Handschin............... | 343/7 ED X |

Primary Examiner—Malcolm F. Hubler
Attorney—Kenyon and Kenyon Reilly Carr & Chapin

[57] ABSTRACT

The triggering of the camera depends on the chronological behavior of the Doppler frequency. The difference indicator supplies a signal from a comparison of the measured Doppler voltage value with a stored value and the measured time indicator measures the time it takes a vehicle to cover a fixed distance and produces a responsive signal. The evaluator produces a signal from these latter signals to either block triggering of the camera or actuate triggering after a set time delay.

14 Claims, 6 Drawing Figures

INVENTOR
RUDOLF BALSIGER
BY
Kenyon & Kenyon
ATTORNEYS

APPARATUS AND PROCESS FOR TRIGGERING THE CAMERA OF A DOPPLER SPEED-MEASURING APPARATUS

This invention relates to a method and apparatus for triggering the camera of a Doppler radar speed-measurement apparatus and, more particularly, for triggering the camera to accurately photograph a speeding vehicle.

Doppler radar speed-measuring apparatuses having photograph-taking equipment are known which serve, among other things, to determine those vehicles which exceed a certain speed-limit when passing through an effective radar-ray zone. In such cases, it is possible to automatically take a photograph of the vehicle concerned as well as its license plate. In addition, the speed as indicated by a suitable measuring instrument is usually blended into the photograph by means of optical aids during the passage of the vehicle through the speed-measuring zone. Also additional data, such for example as the time of day, the date, and the place where the measurement was made, can be imposed on the photograph for the purpose of making the photograph serve police authorities as evidence.

Generally, the automatic triggering of the camera is, for example, effected by the vanishing Doppler signal as the vehicle leaves the effective radar-ray zone. However, in traffic situations where there are a number of vehicles, it is possible for a situation to occur in which the speed measured by the Doppler radar speed-measurement apparatus can not be clearly associated with one of a number of vehicles appearing in the photograph. This is particularly the case when there are overtaking vehicles, or when traffic in the opposite direction is unintentionally photographed by the radar apparatus. Under such conditions, the photographs taken, cannot be indisputably evaluated and are worthless as evidence of speeding.

Accordingly, it is an object of the invention to automatically trigger the camera of a Doppler radar speed-measuring apparatus only when the measured speed can be indisputably related to a certain vehicle in the photograph taken.

It is another object of the invention to obtain reliable accurate photographs of speed measured vehicles.

It is another object of the invention to obtain accurate speed-measured photographs of vehicles in a rapid manner.

It is another object of the invention to actuate a Doppler speed-measuring apparatus in an accurate manner to correctly photograph and measure a speeding vehicle.

Briefly, the invention relies on the observation and evaluation of the chronological behavior of the Doppler frequency, or of measured values dependent on it to deliver information as to the prevailing reflection relationship and, through this, the instantaneous traffic situation. The changes of the Doppler frequency thereby yield usable criteria which is used for triggering the camera. By "Doppler frequency" is meant the absolute frequency difference between the signal radiated out from the radar apparatus and the reflected signal the radar apparatus receives.

The invention provides an apparatus which is connected to a Doppler radar speed-measuring apparatus and which includes a difference indicator, a measured time indicator and an evaluator. The difference indicator evaluates changes in a measured value dependent on the Doppler frequency and emits a difference signal in the event that the results of the evaluation exceeds a certain tolerance range. The time indicator measures the time it would take a measured vehicle to travel a certain set distance so as to produce a logical signal corresponding to that time. The signals from these indicators are then delivered to the evaluator, the signal from the difference indicator first passing through a bistable switching device. The evaluator then evaluates the signals received and either triggers the camera or not depending on the received signals.

The difference indicator serves to evaluate the behavior of the voltages dependent on the Doppler frequency of the signal bounced from a vehicle in the radar zone of the measuring apparatus. That is, the difference indicator determines when the actual voltage of the Doppler signal deviates from a tolerance range based on a stored measured value voltage and produces a difference indication signal in response to the deviations. Should only one vehicle pass through the radar zone then a difference signal is produced upon the vehicle leaving the radar zone. However, if another vehicle enters the radar zone at the same time while moving at a higher speed, a difference signal corresponding to this occurence can be produced before the first vehicle leaves the radar zone.

The measured time indicator functions to receive the actual voltage of the Doppler signal and to determine the time it would take the vehicle to cover the fixed distance based on this voltage. A logical signal in the form of a pulse for the determined length of time which corresponds to the speed of the vehicle is then produced and emitted to the evaluator.

From the time that the evaluator first receives the logical signal, the evaluator is blocked so that no photograph can be taken by the camera of the speed measuring apparatus. However, once this logical signal disappears, the evaluator then is free to determine whether or not the camera can be triggered. Thereafter, should no irregularities occur in the Doppler signal, the difference indicator sends a difference signal to the evaluator as the vehicle leaves the radar zone. Shortly thereafter, the evaluator triggers the camera.

In the event that the Doppler signal should increase due to a speeding vehicle overtaking the first vehicle in the radar zone before the logical signal disappears, the resulting difference signal of the difference indicator is blocked from the evaluator. At the same time, the stored value of the first vehicle is cancelled. Thus, after the logical signal disappears, the evaluator remains in a state of rest and does not trigger the camera.

The process of the invention uses, as one of all criteria, changes in the Doppler frequency $f_D$ that exceed a certain tolerance range related to the measured Doppler frequency in order to trigger the camera.

Figure 2:
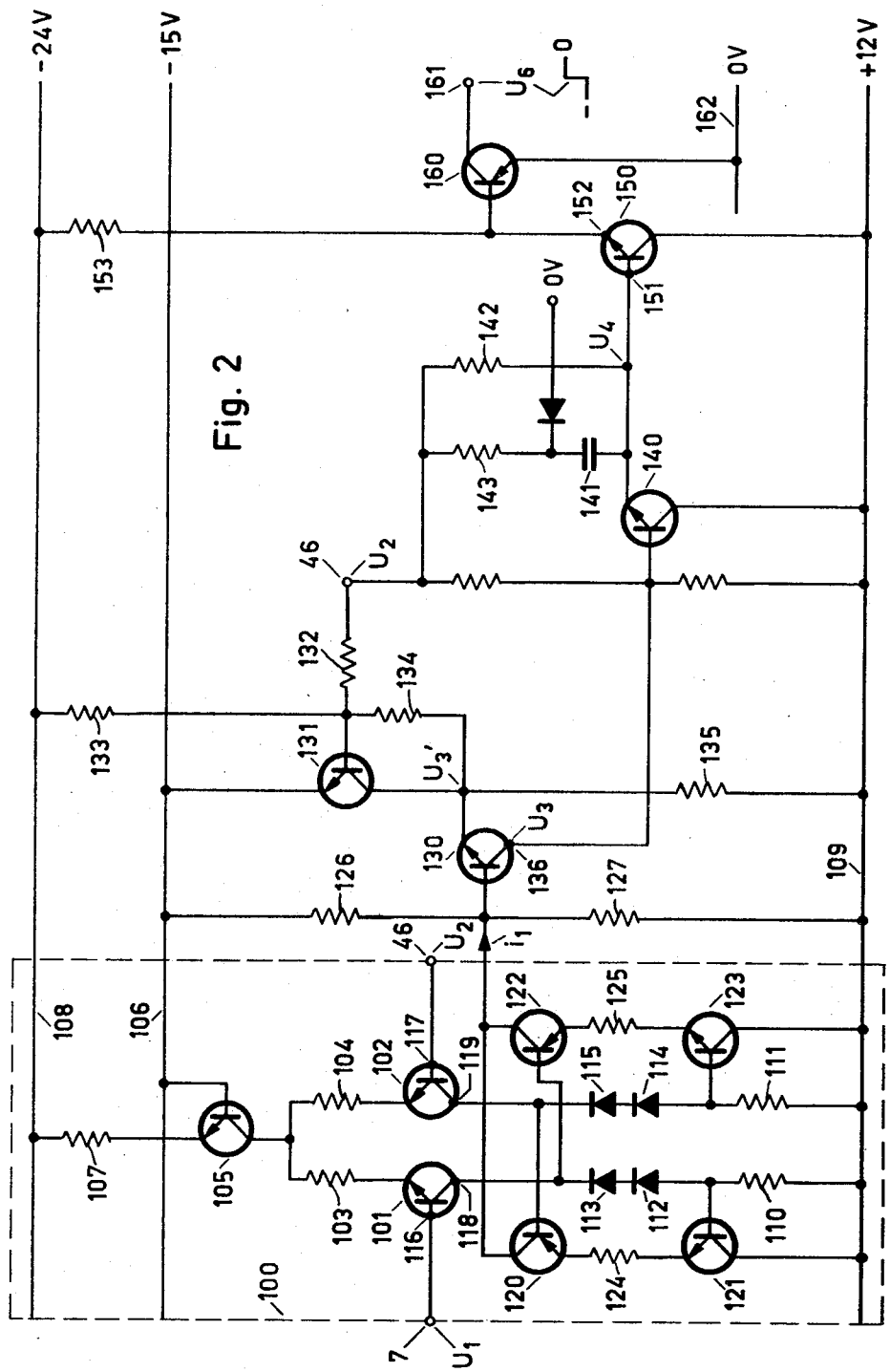
Figure 3:
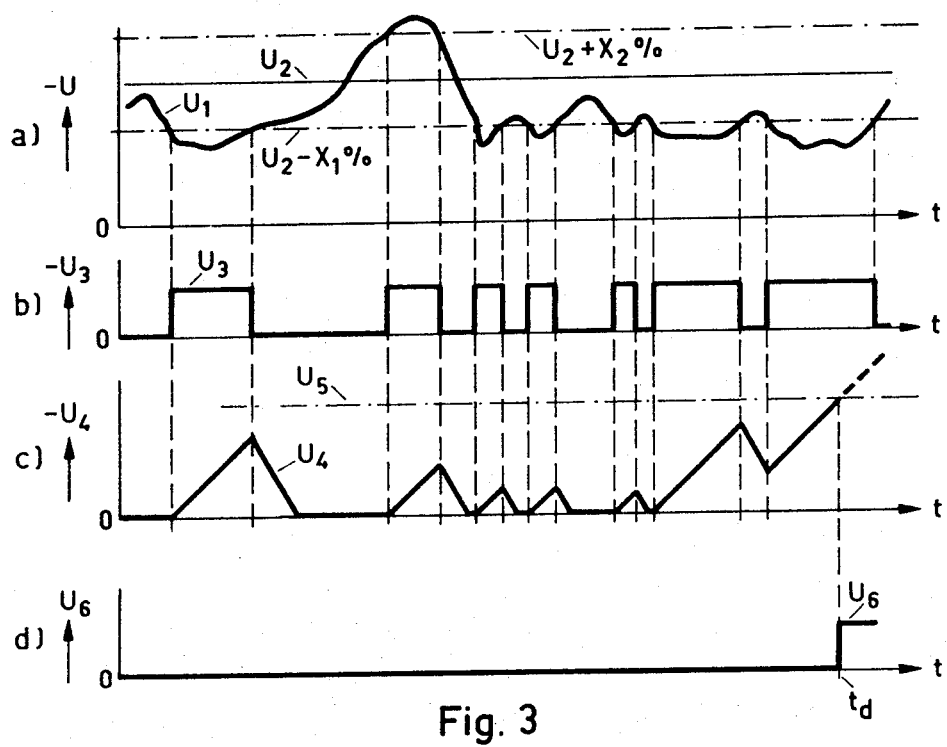
Figure 4:
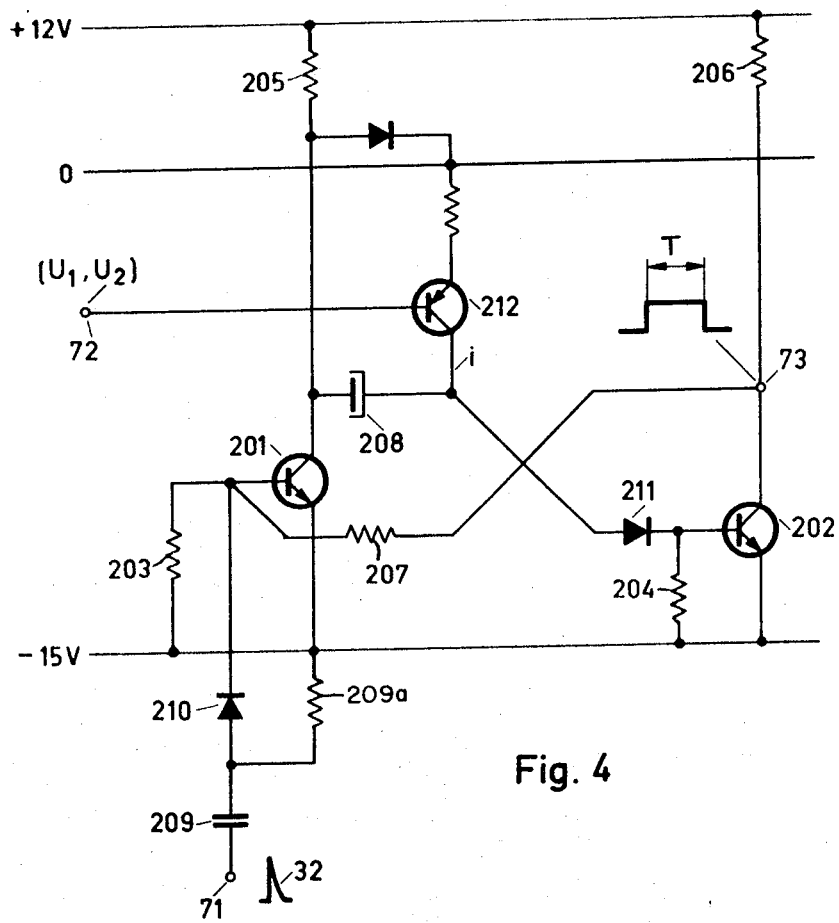
Figure 5:
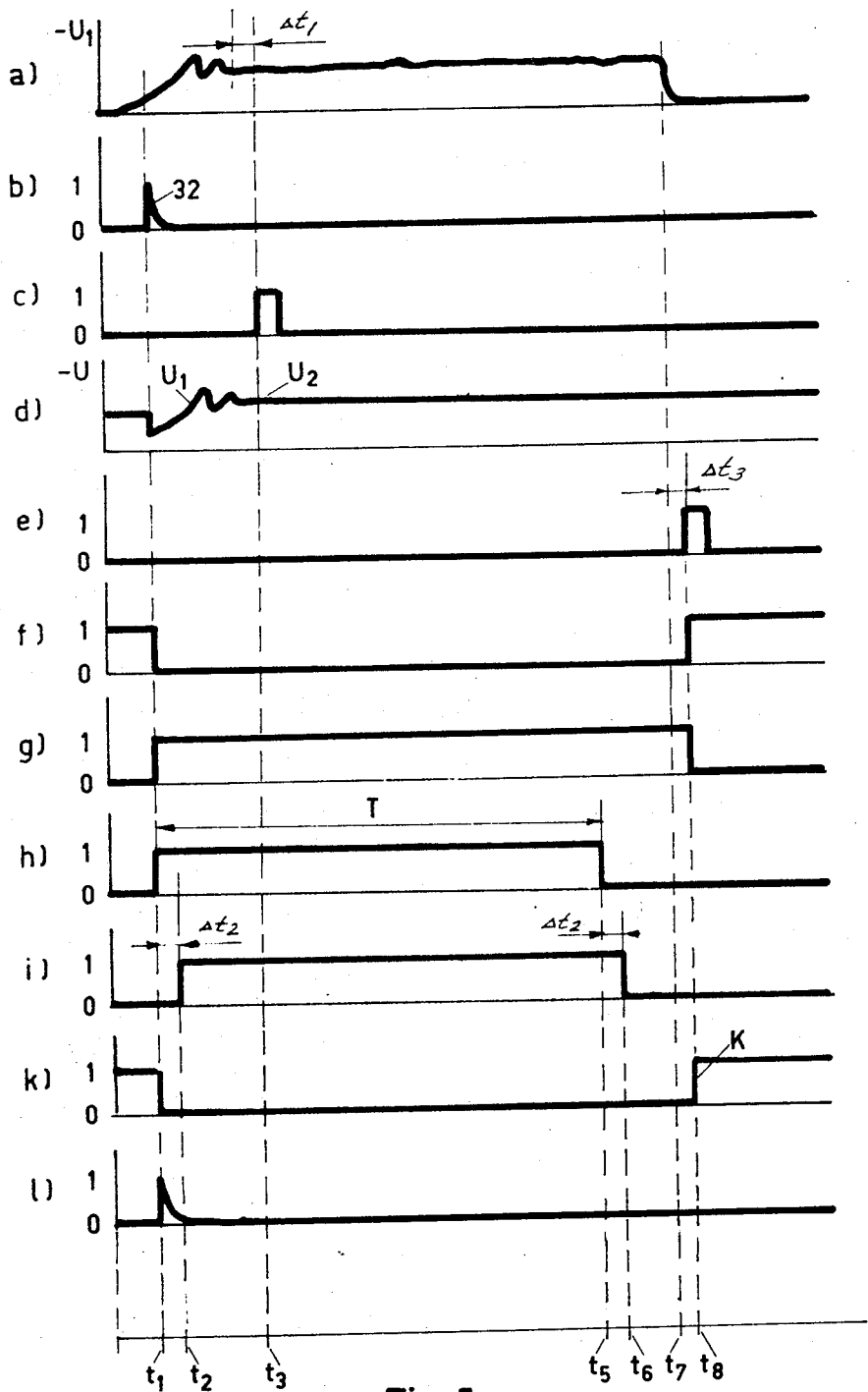
Figure 6:
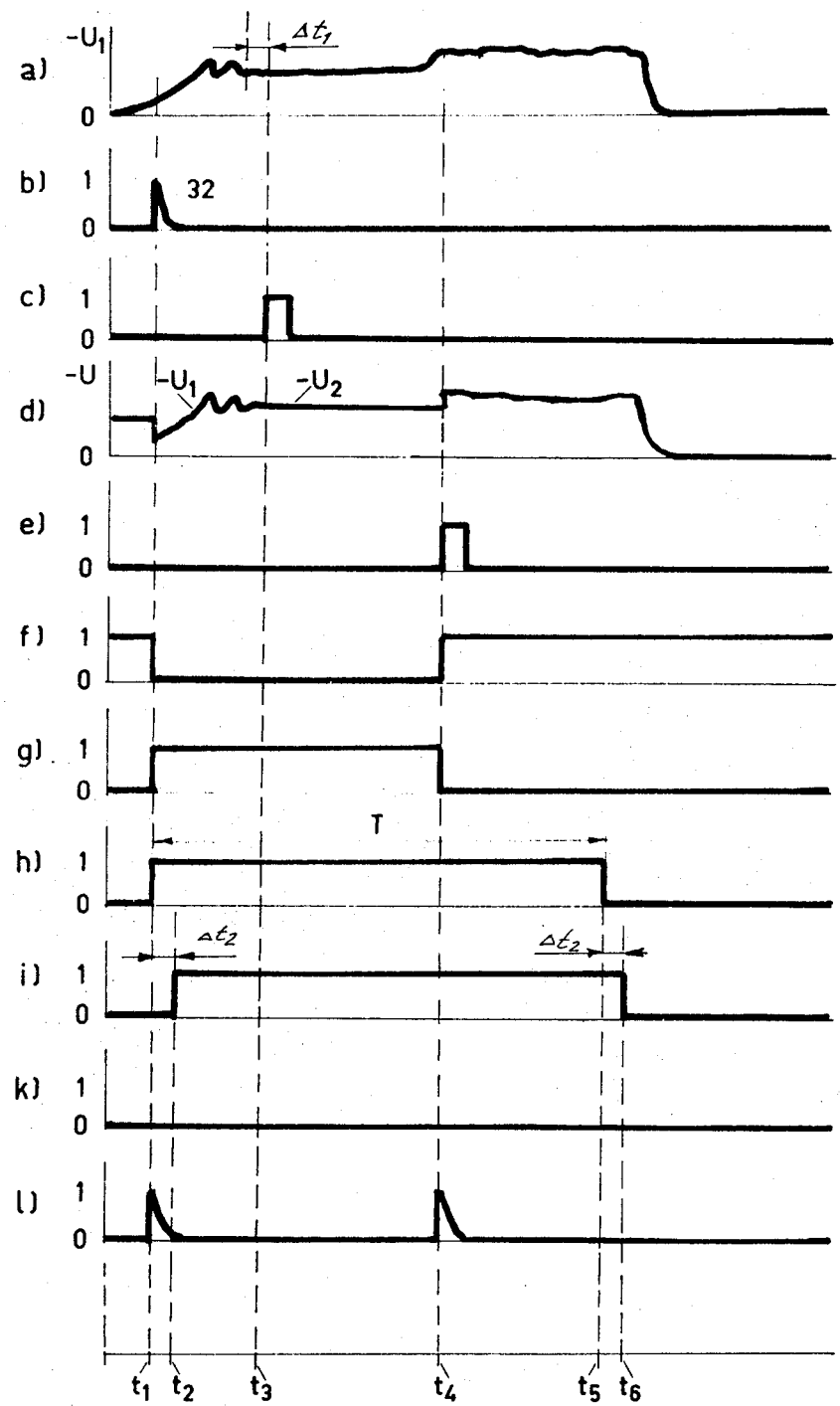

These and other objects and advantages of the invention will become more apparent from the following detailed description and appended claims taken in conjunction with the accompanying drawings in which:

FIG. 1 diagrammatically illustrates a block diagram of one circuit for carrying out the invention;

FIG. 2 diagrammatically illustrates a circuit diagram of a difference indicator according to the invention;

FIG. 3 graphically illustrates one chronological pattern of voltages in a difference indicator according to FIG. 2;

FIG. 4 diagrammatically illustrates a circuit diagram of a measured time indicator according to the invention;

FIG. 5 graphically illustrates a pattern of voltages in the circuit of FIG. 1 for triggering of the camera; and FIG. 6 graphically illustrates a pattern of voltages in the circuit of FIG. 1 for the case of disturbed reflection relationships and resultant absence of camera triggering.

In use, the Doppler radar speed-measuring apparatus is for example, set up at one side of a roadway, and the axis of its radiation diagram is oriented at a relatively small angle from the direction in which the vehicle to be measured is travelling. The influence of this angle in obtaining the true speed if the measured vehicle from the Doppler frequency produced by this vehicle, proportionally to the relative speed of the vehicle relative to the radar source, is given consideration in the following in speaking of measured speed values based on the Doppler frequency $f_D$.

Referring to FIG. 1, the Doppler radar speed-measuring apparatus, as is known, has a transmitting and receiving antenna system 1 and a hollow conductor system 2 which connects a transmitting part 3 both with the transmitting and receiving antenna system 1 and also with a mixer stage 4. As is known, a part of the transmitting energy in the mixing stage 4 is superimposed with the received energy from a reflecting object in the radar radiation zone to produce an electrical oscillation (i.e., the Doppler signal) having the Doppler frequency $f_D$. After amplification in an amplifier 5 operably connected to the mixer stage 4, a voltage $u_1$ proportaional to the Doppler frequency $f_D$ is formed from this electrical oscillation in a frequency converter 6 and put out at a terminal 7. A current supply the various supply voltages for the electronic circuits to be described farther on. In addition, the apparatus has a photograph-taking apparatus 9 including a camera 10, which can be triggered by an electrical signal received at a terminal 11 connected to the camera 10. The apparatus 9 also includes a measuring instrument 12, calibrated for example in kilometers or miles per hour, to which an electrically measured value proportional to the speed is supplied over a terminal 13 by means of optical aids so that its indication can be blended into the photograph taken. There thus appears on each photograph at least the measured vehicle and its measured speed.

The photographic apparatus can, as is known, also comprise other parts, for example, a time-clock which gives the time and date, a flashlight apparatus, and so forth.

The apparatus 20 for carrying out the process of the invention is connected to the terminal 7 of the converter 6 and the terminals 11, 13 of the photograph-taking apparatus 9 to evaluate the information supplied to it over a conductor 14 from the terminal 7, which information is contained in the voltage $u_1$ proportional to the Doppler frequency $f_D$, and, under certain condition, to supply a camera triggering signal to the terminal 11 of the photographic apparatus 9. To this end, the apparatus 20 includes an entry indicator 30, a measured value storer 40, a difference indicator 50, a bistable switching device 60, measured time indicator 70 and an evaluator 80.

The entry indicator 30 monitors the voltage $u_1$, which is proportional to $f_D$ and is supplied to it over the conductor 14 and, as soon as this voltage meets certain conditions, gives an entry indicating pulse 32 to its output terminal 31.

The measured valve storer 40 which is connected to the conductor 14 comprises an electronic computer 41 of known type connected to an input terminal 42 and a separator stage 43 connected to the computer 41 and terminal 42. The computer 41 functions so as to open the separator stage 43 when the voltage $u_1$ supplied to it over an input terminal 42 meets certain conditions. The voltage $u_1$ is then sent to a storage organ 44, for example, a condenser, connected to the separator stage 43 for storing the special measured value $u_2$ of the generally variable voltage $u_1$ which prevails immediately before the opening of the separator stage 43.

In order to avoid detrimental reactions on the storage process, the stored measured value $u_2$ is thereafter conducted over an amplifier 45 to an output terminal 46 of the measured value storer 40.

The difference indicator 50, whose construction and operation will be explained later by the aid of FIGS. 2 and 3, compares the electric voltages $u_1$ and $u_2$, supplied to its input terminals 51 and 52 over the conductors 14 and 49, respectively. The changes of the voltage $u_1$ relative to the voltage $u_2$, when these changes exceed a certain tolerance range related to the measured speed and thus also to the stored voltage $u_2$ produce a difference indication, for example, in the form of an electric pulse as described below.

The bistable switching device 60, for example, a flip-flop, receives the difference indication from the difference indicator in a known manner. In addition, the bistable switching device 60 receives the entry indicating pulse 32 from the input indicator 30 at an input terminal 61. In operation, the switching device, at the instant $t_1$ when a vehicle enters into the effective radar zone, tilts into a definiate first switching state. As a result of a difference indication at a later point of time $t_8$, for example, in the form of an electrical pulse which is conducted from the output terminal 53 of the differnce indicator 50 to another input terminal 62 of the bistable switching device 60, the switching device 60 tilts into its other definite switching state.

As a result of the tilting from one switching state into the other state, the bistable switching device 60 supplies an output pulse which is, for example, positive to its output terminal 63 and a pulse which is, for example, negative, to its output terminal 64. These pulses are then transmitted to the evaluator 80 which, while taking into account other criteria, on occasion emits a camera triggering signal K.

A photograph of a vehicle which at the instant $t_1$ enters into the effective radar zone should, for optical reasons, be taken only when the rear of a car A with its number plate has arrived at an advantageous position, which may be termed the photo-place, relative to the camera location and its field of view. For example, it has been knwon that the photo-place should be chosen as the place where the car rear is leaving the effective radar zone. Without further changes in the speed-measuring apparatus, when the car A leaves the effective radar zone, the reflection of the radar transmitter signal from the car A ceases, the Doppler signal vanishes, and thus also the voltage $u_1$. This vanishing of the voltage $u_1$ causes the differnce indicator 50 to indicate a difference, so that, through the intermediary of the bistable switching stage 60 and the evaluator 80, a camera triggering signal K can occur. The speed of a car A is now measured not at the instant $t_1$ (the instant of the entry indication pulse 32) but at a somewhat later instant, for example, $t_3$, as an analog measured value $u_2$ which is stored in the measured value storer 40 and is indicated by the measuring instrument 12. If up to the instant $t_8$, when the car A reaches the photo-place and leaves the effective radar zone, no other car goes into the effective radar zone, then the speed measurement appearing on the already taken photograph can be definitely associated with this car A (the scale of the measuring instrument being blended into the photograph).

Other traffic conditions may, however, make this association dubious. For example, in the case where a car B, which is travelling at 80 km/hour overtakes, in the overtaking lane, a car C that is travelling correctly at a speed of 57 km/hour, and moves as the first car into the effective radar zone, its measured speed (80 km/h) will be stored. Further, should the overtaken car C now enter the radar zone before car B leaves the effective radar zone, the reflection of the radar signal continues. Thus, it is only when car C leaves the radar zone, and only when in the meantime no other car has entered this zone, that apparatuses working in the usual way produce triggering of the camera through a vanishing of the Doppler signal. As a result, car C becomes situated at the photo-place and is photographed together with the measured value (80 km/h) originating from the car B. Because, car C is, however, travelling at the correct speed (57 km/h), a photograph is produced which leads to error and which falsely associates a measured value with an unmeasured car.

Similar errors can also arise because of a speeding car D in an opposite direction lane, when, as may be the case, the reflection produced from the car D cannot be sufficiently suppressed.

In order to effect triggering of the camera or the taking of a photograph only when a definite association between the measured value and car is obtained, the difference indicator 50 has quite special features and characteristics, which will be described in the following.

Since recognition that the reflection relationships shown in the chronological behavior of the Doppler frequency $f_D$ permits the drawing of conclusion as to a traffic situation, this behavior of the Doppler frequency $f_D$, or of measured values derived from it, is monitored and evaluated through a certain section $s$ of roadway, preferably within the effective radar zone. In the first place, it is therefore necessary to establish a definite travelled section $s$ which represents that distance which a car travels from the instant $t_1$ when it enters into the effective radar zone until an instant shortly before leaving the effective radar zone, i.e., shortly before the instant when the camera is triggered.

While the car is travelling through the distance $s$, the following occur:

a. At the beginning of travelling the distance $s$, an entry indicting pulse 32 occurs at the instant $t_1$.

b. The Doppler signal having the Doppler frequency $f_D$ produces a voltage $u_1$, which is examined for its chronological behavior.

c. If the voltage $u_1$ remains approximately constant while the car travels a relatively short distance, 0.5 meter for example, during the time $\Delta t_1$, then this is regarded as a sign of undisturbed reflection conditions, and on the basis of the then occurring Doppler frequency there is stored in the measured value storer 40 a voltage $u_2$ as the measured value of the car speed at the instant $t_3$.

d. From this instant $t_3$ and up to the instant $t_5$ when the car A has covered the distance $s$, the changes of the voltage $u_1$ relative to the value of voltage $u_2$ stored at time $t_3$ are monitored.

The monitoring of the voltages $u_1$, $u_2$ can also include an evaluation of the changes as to magnitude of their chronological sequence, and also an evaluation as a function of a measured value, $u_2$ for example, in the difference indicator 50.

The establishment and the marking of a time interval $t_1-t_5$, which interval is required by the car to travel the distance $s$, is accomplished by the measured time indicator 70. Also, the consideration of the various criteria for triggering the camera 10 is accomplished in the evaluator 80. However, before going into the details of this evaluation of the criteria in the evaluator 80, there will be given in the following a description of the construction and operation of examples of construction of a difference indicator 50 and of a measured time indicator 70.

Referring to FIG. 2, the difference indicator 50 includes a difference amplifier which has a pair of transistors, 101, 102 having characteristics that are as alike as possible and which are connected over their emitter resistances 103, 104, respectively, and over a transisotr 105 and its emitter resistance 107, with a collector bar 108 supplying a —24 volts potential. The transistor 105, whose base is connected with a collector bar 106 supplying —15 volts, as is known, provides a constant current through the difference amplifier 100. By means of collector resistances 110, 11, respectively, and diodes 112, 113 and 114 and 115, respectively, the collectors 118, 119 of the transistors 101, 102 are connected to a collector bar 109 supplying a +12 volts potential. The chronologically variable voltage $u_1$ (see FIG. 3, diagram a) is conducted from the terminal 7 to the base 116 of the transistor 101. While, on the other hand, the base 117 of the transisotr 102 receives the voltage appearing at the terminal 46 of the measured value storer 40 (see FIG. 1) that is, from the time $t_1$ to $t_3$ it receives voltage $u_1$, and after the instant $t_3$ up to the subsequent cancellation of the stored measurement, it receives voltage $u_2$. The currents appearing at the collectors 118 and 119, because of the voltages $u_1$ and $u_2$ at the bases 116, 117, respectively, are in the following amplifier stages amplified with the transistors 120, 121 and 122, 123, respectively. From the values of these voltages $u_1$ and $u_2$ the difference amplifier 100 forms an output current $i_1$ that is proportional to the absolute value of their difference and is conducted to the base of a further transistor 130, which acts as a limiter. The emitter of this transistor 130 is connected to a variable potential $u'_3$, so that this transistor 130 acting as a limiter operates with a variable limiting level. The variable potential $u'_3$ is formed by the voltage drop at a collector resistance 135 of a transistor 131, to whose base there is applied, over a resistance 132, the speed dependent measured value $u_2$.

The resistances 124 and 125 in the difference amplifier 100 determine the sensitivity of the difference amplifier 100 and may, for example, be of equal size and selected in such a way that the difference indication appears when $u_1$ is + or — $x$ volts different from $u_2$. The resistances 124 and 125 may, however, also be of different sizes, and be selected in such a way that the difference indication appears, for example, at $u_2 - x_1$ and at $u_2 + x_2$. It is particularly advantageous to select $x_2$ greater than $x_1$, because the Doppler frequency $f_D$, and therefore $u_1$, during the passage of a car at constant speed, rises as the angle between the direction of travel and the reflected radar beam becomes smaller.

The stage of the difference indicator consisting of the transistors 130 and 131, with their associated resistances 126, 127, 132, 133, 134 and 135 and receiving the potential $u_2$ supplied from the terminal 46 of the transistor 131, evaluates the output current $i_1$ coming from the difference amplifier 100 as a function of the absolute value of $u_2$, and because of the limiting action of the transistor 130 forms a sequence of pulses of variable duration. (See FIG. 3, diagram 6, potential $u_3$ as a function of time). The pulses of potential $u_3$ consequently indicate when the voltage $u_1$ falls short of the value $u_2$ by $-x_1$ percent, and indicate when the voltage $u_1$ exceeds the value $u_2$ by $+x_2$ percent.

The difference indicator also includes an integration stage having transistors 140 and 150 wherein an evaluation of the potential $u_3$ is carried out based on the changes of the Doppler frequency $f_D$ and the measured value of the voltage $u_1$ respectively, as respect the behavior of $u_3$ chronologically. During the duration of the difference indication (pulse of potential $u_3$), the transistor 140 becomes blocked, and a condenser 141 becomes discharged over a resistance 142. The potential at the base 151 of the transistor 150 thus approaches the potential $u_2$. However, during the duration of the gaps between pulses (see FIG. 3, diagram $b$) no difference indication occurs. Thus, during the duration of these gaps between pulses, the condenser 141 becomes charged again over the then-conductive transistor 140 and resistance 143, and the potential at the base 151 of the transistor 150 moves toward positive values.

The state of charging of the condenser 141 depends on the relationship of pulse width and gap width of the difference indications, that is, on the potential $u_3$. It is therefore advantageous to assign less weight to the pulses than to the gaps, that is, to make the resistance 142 greater than the resistance 143.

Referring to FIG. 3, diagram $c$) shows one possible chronological pattern of the potential $u_4$ appearing at the base 151 of the transistor 150. From this it can be seen [compare also with diagram $a$)] that when the potential $u_1$ departs from the tolerance range set by the limits $u_2 - x_1$ percent, limits that is to $u_2$ and thus to the speed of the car, a difference indication always occurs [diagram $b$)] in the form of a pulse of the potential $u_3$, and it can be seen that during this time a voltage $u_4$ rises [diagram $c$)]. However, if the voltage $u_1$ moves back again into the tolerance range ($u_2 - x_1$ percnet ... $u_2 + x_2$ percent), then the voltage $u_4$ goes back to zero, and a gap occurs between pulses during which the voltage $u_4$ becomes re-formed. If the gap between pulses lasts long enough, then $u_4$ falls back to zero, and begins to rise again only through a following $u_3$ pulse. If, on the other hand, a pulse is sufficiently long (i.e., a length during which the voltage $u_1$ has left the tolerance range), or if there is a rapid sequence of short pulses, then the voltage $u_4$, for example at the instant $t_d$, finally reaches an established limit value $u_5$. As soon as this limit value $u_5$ is exceeded by the voltage $u_4$ at the base 151 of the transistor 150, the switching resistance 160, controlled by the emitter 152 of the transistor 150, switches through the zero potential (collector bar 162), and produces an output pulse $u_6$ [diagram $d$)] at its collector connection 161, and in this way produces a difference indication through the potential $u_6$.

Referring to FIG. 4, the measured time indicator 70 has the function of computing the time $t$, and of marking what a car having the speed $v$ requires to cover a distance $s$. The time $t$ can then be expressed by the formula $t = s/v$ or since $s$ is a constant $t = k_1 \cdot 1/v$. This law is analogous to the law for the time for charging a condenser C with a constant charging current $i$, that is, $t = c \cdot u_c/i = k_1 \cdot 1/i$. Therefore, if care is taken to have for the discharging or charging of a condenser C, a current $i$ which is proportional to the measured speed $v$, then with a suitable choice of the constants $k_1$ and $k_2$, it is possible to construct an analog computer circuit fo the equation $t = s/v$, for example, as shown in FIG. 4.

In a monostable circuit of the analog computer circuit of the measured time indicator consisting of the transistors 201, 202, of the resistances 203, 204, 205, 206, 207, 209a and of the condenser 208, in the state of rest, the transistor 201 is blocked and the transistor 202 is conductive. The condenser 208 is then charged to 15 volts. If a positive pulse (for example, the car entry pulse 32) is then conducted over a condenser 209 and a diode 210 to the base of the transistor 201, then the switch state tilts. That is, the transistor 201 becomes conductive and the transistor 202 becomes blocked. The collector potential of the transisotr 201 then jumps from 0 to $-15$ volts.

This jump of potential is transmitted over the condenser 208 to a diode 211, through which a blocking potential of 15 volts becomes applied instantaneously. A voltage proportional to the measured speed, namely the output voltage of the measured value storer 40 (FIG. 1) is then applied to the base 72 of a transistor 212, that is, from the time $t_1$ to $t_3$, the voltage $u_1$ and from $t_3$ onward, the voltage $u_2$. Through transistor 212, this results in a current $i$ proportional to the speed. This current $i$ discharges the condenser 208 until the diode 211 becomes conductive again upon which the switch state tilts back. From the instant of the starting pulse over the condenser 209, until the instant of the tilting back of the switch state, the time T lapses, and at the collector of the transistor 202 a pulse of T seconds duration is taken off as a logical signal at the terminal 73.

Referring again to FIG. 1, the various criteria for forming a camera triggering signal are linked together in the evaluator 80. To this end, the evaluator 80 comprises an AND gate 81, which links together the criterion: difference indication of the difference indicator 50 — conducted onward over the bistable switching device 60 to the evaluator 80 — and the criterion: length of time T of the measured time indicator pulse at terminal 73 (FIG. 4). A difference indication at the input 82 can therefore not reach the output 84 of the AND gate 81, and thus cannot reach the photographic apparatus 9 over a conductor 86 as a camera triggering signal K, so long as the input 83 is blocked by a logical signal $i$ from the terminal 73 of the measured time indicator 70. A photograph can therefore not be taken before the time $t_5$. Only after the lapse of the interval of time T at the instant $t_5$, that is, only after the car under consideration has covered the distance $s$ in the radar zone, does the logical signal at the output terminal 73 of the measured time indicator 70 vanish. Thus, only after this instant $t_5$ can an eventual difference indication from the difference indicator 50, via the bistable switching device 60 and the AND gate 81, effect a triggering of the camera.

In the time from $t_1$ (pulse announcing entry of car) to the instant $t_3$ (storage of $u_2$), $u_1$ and $u_2$ are of equal magnitude, because (FIG. 1) the separator stage 43 then conducts the value $u_1$ to the output terminal 46 of the measured value storer. Therefore, in the interval of time from $t_1$ to $t_3$ no difference indication can occur and triggering of the camera is prevented by the closed AND gate 81.

After the instant $t_3$ an indication of a difference is, however, possible. If such an indication of differnece occurs between the instants $t_3$ and $t_5$, then from this is deduced that disturbed reflection conditions exist (for example, one car overtaking another, disturbing traffic in the other direction, and so forth), for which reason associating a car with a measurement in a photograph would be a dubious matter. The disturbed reflection conditions, of course, would mean that the speed value appearing on the photograph could not be definitely related to a certain car. A too early indication of a difference should therefore not effect a triggering of the camera. Consequently, a measured value stored in the measured value storer 40 after the instant $t_3$, that is, before the difference indication occurring at instant $t_5$ (indicative of a disturbed reflection condition) is worthless, and must therefore be cancelled in the measured value storer 40.

In order to cancel a stored measured value, the measured value storer has a cancellation input 98. By the aid of a cancelling pulse applied to this cancellation input 98, the separator 43 becomes closed again. This cancelling pulse is produced upon the occurrence of a too early difference indication as follows: The too early difference indication of the difference indicator 50 causes the bistable switching device 60 to tilt. The pulse thus produced at its output terminal 63 is conducted to an input 91 of an AND gate 90. The other input 92 of this AND gate 92 receives the output potential (logical signal) of the measured time indicator 70 from terminal 73. A pulse appearing during the time from $t_1$ to $t_5$ at input 91 is therefore able to pass this AND gate 90. It can also pass an OR gate 94, and from its output 97 arrive at the cancellation input 98 of the measured value storer 40. By means of a retardation or phase shifting element 85, for example an RC element, the input 83 of the AND gate 81 receives a pulse (logical signal $i$ of terminal 73 of the measured time indicator) corresponding to the measured time T and slightly retarded, taht is by $\Delta t_2$. This takes place in order to avoid an eventual coincidence of the cancellation process (or opening of the gate 90) and triggering of the camera.

It should also be pointed out that the car entering pulse 32 (see FIG. 1) is also conducted to the input 96 of the OR gate 94. This ensures that, before each measurement, an eventual measured value from a previous car that may still be in the measured value storer 40 becomes cancelled, and the measured value storer 40 becomes prepared for the eventual storage of a new measured value (thorugh closure of the separator stage 43).

Referring to FIG. 5, during the successful triggering of the apparatus of FIG. 1, the conditions in the diagrams $a$) to 1) show, for various points $a$ to $l$ of FIG. 1, a possible chronological voltage pattern; that is, a camera triggering following the instant $t_5$.

Diagram a) shows a chronological pattern of the potential $u_1$ appearing at the terminal 7 caused by a car passing through the effective radar zone. Before the entry of the car into the effective radar zone no reflections occur, as a result of which no Doppler signal is produced, so that $f_D$ and $u_1$ are both zero. With the entry of a car into the effective radar zone, reflections occur from a suitable place of the car. Because of the irregularity of the car's reflecting places, there are usually at first more or less great variations of the Doppler frequency, and for this reason also of the voltage $u_1$. If only the car is in the radar zone, then experience shows that the pattern of the voltage $u_1$ soon smooths out. As soon as (instant $t_1$) the voltage $u_1$ exceeds an adjusted to minimum value, the car entry indicator 30 emits a car entry pulse 32 [diagram $b$)]. The bistable switch 60 then becomes set into its initial condition [diagrams $f$) and $g$)]. The car entering pulse also starts the measured time indicator 70 [diagram $h$)].

When the car leaves the effective radar zone, for example, at the instant $t_7$, then the difference indicator 50 shortly thereafter ($\Delta t_3$), i.e., at the instant $t_8$, gives a difference indication [diagram $e$)] [As respects $t_3$ see also FIG. 3, diagram $c$) and $d$)]. This difference indication causes the bistable circuit 60 at the instant $t_8$ to tilt again, so that the potentials at its output terminals 63 and 64 change [diagram $f$) and $g$)].

The measured time indicator 70, which at the instant $t_1$ becomes started by the car entrance pulse 32, during the interval of time T puts out at its output terminal 73 a logical initial potential of, for example, 1. (The interval of time T corresponds to the time it takes for the car to travel the distance $s$) [diagram $h$)]. Due to the phase shifting element 85 (for example, by an RC phase shifter) the logical output voltage $i$ of the terminal 73 appears slightly retarded, i.e., by $\Delta t_2$ at the input 83 as a result of the selected polarities, and acts as a blocking voltage of the AND gate 81. This blocking voltage vanishes only after expiration of the time T, at the instant $t_6$. Then, at the later instant $t_8$, the voltage pulse from the terminal 63 of the bistable switch 60 [diagram $f$)] to the input 82 of the AND gate 81 is able to pass this gate, and as the camera triggering signal K, diagram k), is able to trigger the camera by way of the conductor 86 and terminal 11.

The measured value $u_2$ remains stored. Only after another car entering pulse 32 for another car does a cancelling pulse arrive, by way of the OR gate 94, at the cancellation input 98 of the measured value storer 40, and cancels the value $u_2$ still stored there.

Referring to FIG. 6, should a too early difference indication arise, that is, at the instant $t_4$ before the distance $s$ has been travelled through, it is assumed that the conditions are the same up to the instant $t_3$ as in FIG. 5. The diagrams $a$), $b$), $c$) and $d$) are therefore in agreement with the corresponding diagrams of FIG. 5 up to the instant $t_3$.

After the instant $t_3$, the measured value $u_2$ is stored [diagram $d$)]. Shortly after this, $u_1$ now changes relatively greater, for example, because an overtaking car produces a higher Doppler frequency $f_D$. As soon as this change of $u_1$ has lasted a sufficient length of time [FIG. 3, diagram $c$)], the change of $u_1$, for example at the instant $t_4$, releases a difference indication, [diagram $e$)]. This difference indication produces a tilting-back of the bistable switching stage 60 at the instant $t_4$, [diagrams $f$) and $g$)]. However, the output pulse at the terminal 63 of the bistable switching stage 60 [diagram *f*)] cannot pass the AND gate 81, because the logical voltage *i* is still given out over the retardation element 85 from the terminal 73, and acts as a blocking voltage [diagram *i*)].

Because the AND gate 81 is blocked, there is therefore no triggering of the camera through the too early difference indication; the camera triggering signal K being absent [diagram *k*)].

The output pulse from terminal 64 of the bistable switching stage 60 on the other hand, and as a result of the output voltage *i* which is still applied to the connection 92 of the AND gate 90, is able to pass this AND gate 90. Moreover, the output pulse is able to act over the OR gate 94 as a cancellation signal [diagram *l*)] at the cancellation input 98, for cancelling the stored value $u_2$.

It is noted that, for example, with less strict requirements, it is also possible to carry out a simplified process in accordance with the invention, through which the apparatus can be made correspondingly simpler. For example, the evaluation of the changes of the Doppler frequency can be done in a simplified way only; or the measured time indicator 70 can operate with a constant measured line independently of the car speed.

What is claimed is:

1. An apparatus for triggering a camera of a Doppler radar speed-measuring apparatus for vehicles comprising:
   a difference indicator connected to the speed measuring apparatus and camera for receiving a voltage proportional to the Doppler frequency from the speed measuring apparatus in response to the detection of a vehicle in a radar zone of the speed measuring apparatus,
   said difference indicator having means for evaluating changes in said voltage in relation to a particular tolerance range to produce a difference indication upon said voltage exceeding or falling below said range;
   a measured time indicator for measuring the time for the detected vehicle to pass through a set distance in response to the detection of the vehicle in the radar zone and for emitting a pulse corresponding to said time; and
   an evaluator connected to said difference indicator and said measured time indicator for receiving said difference indication and said pulse, said evaluator being connected to the camera for emitting a camera triggering signal to said camera in response to an occurrence of said difference indication after expiration of said pulse, said evaluator having means for blocking emission of said camera triggering signal during emission of said pulse from said measured time indicator.

2. An apparatus for triggering a camera of a Doppler radar speed-measuring apparatus for vehicles comprising:
   an entry indicator connected to the speed measuring apparatus to emit a signal upon entry of a vehicle into the radar zone;
   a storer connected to the speed measuring apparatus for temporarily storing a measured value voltage dependent on the Doppler frequency in response to a period of relatively undisturbed reflection conditions;
   a difference indicator connected to the speed measuring apparatus for receiving a first voltage proportional to the Doppler frequency from the speed measuring apparatus in response to the detection of a vehicle in the radar zone of the speed measuring apparatus, said difference indicator being connected to said storer for receiving said measured value voltage and having means for evaluating changes in said first voltage in relation to a particular tolerance range of said measured value voltage to produce a difference indication upon said first voltage exceeding said range, and
   said difference indicator being connected to the camera for blocking triggering of the camera in response to occurrence of said difference indicator.

3. An apparatus as set forth in claim 2 wherein said difference indicator includes a difference amplifier for receiving said first voltage and said stored value voltage to produce a current proportional to the differences between said voltages, and a limiter connected to said difference amplifier and said storer and having an operating level variable as a function of the measured speed of the vehicle in the radar zone for establishing said tolerance range about said measured value voltage to emit a pulse upon said current exceeding said range.

4. An apparatus as set forth in claim 3 wherein said difference indicator further includes an integration stage connected to said limiter and said storer for integrating said pulse from said limiter with respect to said measured value voltage to produce the difference indication.

5. An apparatus as set forth in claim 2 further comprising a measured time indicator connected to said storer and said entry indicator for measuring the time for the vehicle to pass through a set distance in response to said voltages in order to emit a logical signal in response thereto.

6. An apparatus as set forth in claim 5 wherein said time indicator includes a controllable switching element connected to said storer to receive said measured value voltage and a monostable circuit having a condensor connected to said switching element and having a tilting time variable in response to a speed-proportional current of said condensor to produce said logical signal in response to said signal from said entry indicator.

7. An apparatus as set forth in claim 5 further comprising a bistable switching device connected to said entry indicator and said difference indicator to receive said signal and said difference indication therefrom and an evaluator connected to said switching device and said time indicator to receive said difference indication and said logical signal therefrom for producing a triggering signal in response to a difference indication occurring after said logical signal, said evaluator being connected to the camera to trigger the camera upon production of said triggering signal.

8. An apparatus as set forth in claim 7 wherein said bistable switching device is responsive to said signal of said entry indicator to move into one of two positions and is responsive to a subsequent difference indication from said difference indicator to move into the other of said two positions.

9. A process for triggering the camera of a Doppler radar speed measuring apparatus comprising the steps of determining the entry of a vehicle into the radar zone of the apparatus, determining the speed of the vehicle a length of time after entry into the radar zone, determining the time the vehicle takes to travel a predetermined distance in the radar zone, determining a change in the Doppler frequency of a Doppler signal in excess of a particular tolerance range related to the measured Doppler frequency during the time the vehicle travels said predetermined distance to produce a difference indication signal in response thereto, and blocking the triggering of the camera in response to said difference indication signal occurring during said time.

10. A process for triggering the camera of a Doppler radar speed measuring apparatus comprising the steps of determining the entry of a vehicle into the radar zone of the apparatus, determining the speed of the vehicle a length of time after entry into the radar zone, determining the time the vehicle takes to travel a predetermined distance in the radar zone, determining a change in the Doppler frequency of a Doppler signal in excess of a particular tolerance range related to the measured Doppler frequency during the time the vehicle travels said predetermined distance to produce a difference indication signal in response thereto, triggering the camera after expiration of said time in response to said signal occurring after said time while blocking triggering of the camera during said time in response to said difference indication signal occurring during said time.

11. A process as set forth in claim 10 wherein said range is established by a percentage of the measured speed.

12. A process as set forth in claim 10 wherein said changes in Doppler frequency are evaluated with respect to chronological behavior thereof prior to triggering of the camera.

13. A process as set forth in claim 10 wherein said changes are evaluated with respect to chronological behavior thereof and as a function of a measured value dependent on the measured speed of a vehicle prior to triggering of the camera.

14. A process as set forth in claim 10 wherein said step of determining the speed of the vehicle includes the storing of a measured value corresponding to the measured speed, said process further comprising the step of cancelling the stored measured value in response to said difference signal indication signal occurring during said time.

* * * * *

UNITED STATES PATENT OFFICE
CERTIFICATE OF CORRECTION

Patent No. 3,754,253     Dated August 21, 1973

Inventor(s) RUDOLF BALSIGER

It is certified that error appears in the above-identified patent and that said Letters Patent are hereby corrected as shown below:

Column 4, line 37, "definiate" should be --definite--.

Column 4, line 59, "knwon" should be --known--.

Column 4, line 66, "differnce" should be --difference--.

Column 6, line 28, "transisotr" should be --transistor--.

Column 6, line 34, "ll" should be --lll--.

Column 6, line 41, "transisotr" should be --transistor--.

Column 8, line 16, "fo" should be -- for --.

Column 9, line 51, "taht" should be --that--.

Signed and sealed this 19th day of February 1974.

(SEAL)
Attest:

EDWARD M. FLETCHER, JR.
Attesting Officer

C. MARSHALL DANN
Commissioner of Patents